United States Patent
Liu et al.

(10) Patent No.: US 12,483,025 B2
(45) Date of Patent: Nov. 25, 2025

(54) ARC EXTINGUISHING CONTROL SYSTEM AND METHOD FOR RELAY OF EMERGENCY POWER SUPPLY

(71) Applicant: SHENZHEN GREPOW BATTERY CO., LTD, Guangdong (CN)

(72) Inventors: Miao Liu, Guangdong (CN); Bing Liu, Guangdong (CN); Gongjiao Tao, Guangdong (CN); Binghua Hu, Guangdong (CN); Zengquan Li, Guangdong (CN)

(73) Assignee: SHENZHEN GREPOW BATTERY CO., LTD, Shenzhen (CN)

( * ) Notice: Subject to any disclaimer, the term of this patent is extended or adjusted under 35 U.S.C. 154(b) by 185 days.

(21) Appl. No.: 18/277,085

(22) PCT Filed: Mar. 30, 2021

(86) PCT No.: PCT/CN2021/084055
§ 371 (c)(1),
(2) Date: Aug. 14, 2023

(87) PCT Pub. No.: WO2022/198694
PCT Pub. Date: Sep. 29, 2022

(65) Prior Publication Data
US 2024/0128738 A1   Apr. 18, 2024

(30) Foreign Application Priority Data
Mar. 26, 2021   (CN) .......................... 202110327462.4

(51) Int. Cl.
*H02H 7/18* (2006.01)
*H01H 47/02* (2006.01)

(52) U.S. Cl.
CPC .............. *H02H 7/18* (2013.01); *H01H 47/02* (2013.01)

(58) Field of Classification Search
CPC ........ H01H 33/04; H01H 33/596; H01H 9/30; H01H 9/542; H01H 9/547; H01H 2009/544; H01H 2009/546
See application file for complete search history.

(56) References Cited

U.S. PATENT DOCUMENTS

2018/0301306 A1* 10/2018 Yang ...................... H01H 47/32
2019/0035571 A1*  1/2019 Guo ........................ H01H 47/24
(Continued)

FOREIGN PATENT DOCUMENTS

| CN | 101710548 A | * | 5/2010 | |
| CN | 202153649 U | * | 2/2012 | .............. H02J 7/027 |
| CN | 210838926 U | * | 6/2020 | |

*Primary Examiner* — Sisay G Tiku
(74) *Attorney, Agent, or Firm* — Birchwood IP (57) ABSTRACT

Disclosed are an arc extinguishing control system and method for a relay of an emergency power supply. A relay serves as a main switching circuit for controlling an emergency power supply, and electronic switching tubes are connected in parallel to two ends of the relay, so as to withstand a voltage jump when the relay is disconnected, and common problems of existing relays, such as arc damage and an internal resistance increase, are solved. When a heavy reverse charging current occurs after the vehicle is started, a reverse charging sensing circuit and a reverse charging feedback circuit are used, so that a reverse charging current is directly fed back to a control end of an electronic switching tube when a storage battery is reversely charged by a load, thereby realizing quick disconnection of the electronic switching tube.

9 Claims, 2 Drawing Sheets

(56) References Cited

U.S. PATENT DOCUMENTS

2020/0203093 A1\* 6/2020 Guo ...................... H02H 3/087
2021/0375561 A1\* 12/2021 Guo ...................... H01H 9/542

\* cited by examiner

ARC EXTINGUISHING CONTROL SYSTEM AND METHOD FOR RELAY OF EMERGENCY POWER SUPPLY

BACKGROUND OF THE INVENTION

The present disclosure relates to the technical field of power supply, in particular to an arc extinguishing control system and method for relay of emergency power supply that can be applied to an emergency start power supply of a vehicle.

When a vehicle is started, the on-board storage battery is used to provide starting power, which drives the starter motor to operate, and then the engine is driven to be ignited and started. At the same time, when the engine of the vehicle is not started, the storage battery can be used for power supply of other on-board electrical equipment. On some occasions, the on-board storage battery may not be able to start the vehicle because it is damaged or runs out of power. For example, the storage battery is exhausted because the lights are turned off after parking, in which case, it is necessary to use an emergency start power supply of the vehicle to replace the on-board storage battery to supply power for starting the engine.

At present, the emergency power supply of a vehicle mainly includes a battery pack, a switch circuit, a control module and a battery clip. The battery pack is connected to the battery clip through the power supply line, the switch circuit is arranged in the power supply line, and the control module is used to control the connection to the switch circuit, so as to realize the switch-on and power supply of the emergency power supply. In actual use, the battery clip is connected to the on-board storage battery, and relevant operations are performed to trigger the operation of the starter motor. After the emergency power supply is successfully started, the starter motor will start to generate electricity as a car engine, charge the on-board storage battery, and further reversely charge the start power supply. The voltage is much higher than the voltage that the internal storage battery of the emergency power supply can withstand, and a heavy reverse charging current is formed, so that the emergency power supply is damaged. In which case, there may be even a risk of fire under the condition that the battery clip is not disconnected immediately. Therefore, the control module of the emergency power supply needs to be equipped with a corresponding detection circuit, and after detecting the successful startup, the switch circuit is driven to quickly switch off the output of the starter power supply. Even so, there must still be a heavy reverse charging current.

In the prior art, for example, the Chinese invention patent with Publication No. CN104979857B discloses a 12V automobile emergency start power supply, which mainly uses a relay as the master control switch, and uses a bypass heating circuit to consume a heavy reverse charging current. In the publication, the relay itself can withstand a relatively heavy current, and no additional heat sink is required, however, as a mechanical switch with physical contact, an arc will be generated when the relay is switched on or off under load, and contacts of the relay will be damaged, so that the internal contact resistance increases after the relay pulls in, and the use of the emergency power supply is eventually affected. For another example, the Chinese invention patent with Publication No. CN204794038U discloses a protection circuit for an automobile emergency start power supply, using a MOS-type electronic switch as the master control switch, which has a relatively rapid speed of connection and disconnection, but withstands a heavy current for a short period of time, and additional heat sink is required; and a unidirectional diode connected in series on the power supply line is used to prevent reverse charging of the heavy current, in which case, more rigorous requirements for the quality and quantity of an electronic switch tube and the unidirectional diode, making the cost high.

BRIEF SUMMARY OF THE INVENTION

In order to solve defects existing in the prior art, the present disclosure aims to provide an arc extinguishing control system and method for a relay of emergency power supply, the relay that has a lower cost and a higher current withstand capability and does not need an additional heat sink is used as a device for controlling the connection and disconnection, and rapid response characteristic of the electronic switch tube is used to delay the connection and disconnection the relay in the order of milliseconds, so that the electronic switch tube can withstand a voltage jump before the relay is disconnected, and the relay thus does not generate arcs.

In order to achieve the above object, the present disclosure uses the following technical solution:

In the first aspect, the invention provides An arc extinguishing control system for a relay of an emergency power supply, including:
  a power supply line, one side thereof being provided with a first port for connecting a battery, and the other side being provided with a second port for connecting a load;
  a relay, an input terminal thereof being connected to the first port and an output terminal thereof being connected to the second port for turning on and off the power supply line;
  an electronic switch tube connected in parallel between the input terminal and the output terminal of the relay; and
  a control module being used for respectively connected to a control end of the relay and a control end of the electronic switch tube in a controllable mode, so that the electronic switch tube can withstand the changes in voltage generated from the disconnection of the relay.

The above control system, optional, further including:
  a reverse charging induction circuit used for inducing a reverse voltage applied from the output terminal to the input terminal of the relay; and
  a reverse charging feedback circuit used for feeding back the induced reverse voltage to the control end of the electronic switch tube through voltage reduction, so as to control the electronic switch tube to be disconnected when a reverse current occurs.

The above control system, optional, wherein the reverse charging feedback circuit comprises the first resistor, the first transistor, a second resistor and a second transistor; both ends of the first resistor are connected in parallel the input terminal and the output terminal of the relay, an emitter electrode and a base electrode of the first transistor are separately connected to both ends of the first resistor, a collector electrode of the first transistor is connected to a base electrode of the second transistor, the base electrode of the first transistor is connected to a collector electrode of the second transistor, the base electrode and an emitter electrode of the second transistor are separately connected to both ends of the second resistor, the emitter electrode of the second transistor is connected to the control end of the electronic switch tube, the first resistor flows the reverse current and a break-over voltage is applied between the emitter electrode and the base electrode of the first transistor, the connection of the first transistor makes the second resistor flow a current, and a break-over voltage is applied to the base electrode and the emitter electrode of the second transistor, so that the electronic switch tube is switched to be disconnected.

The above control system, optional, wherein the reverse charging induction circuit comprises a fourth resistor and a second freewheeling diode, one end of a first resistor is connected to the output terminal of the relay, the other end of the first resistor is connected to one end of the fourth resistor, the other end of the fourth resistor is connected to an anode of the second freewheeling diode, and a cathode of the second freewheeling diode is connected to the input terminal of the relay, so that a reverse current flowing through a series circuit of the first resistor and the fourth resistor will form a voltage at the first resistor that cooperates to connect the first transistor.

The above control system, optional, further including a first freewheeling diode and a third resistor, wherein the electronic switch tube is a field effect transistor, the drain electrode of the electronic switch tube is connected to the output terminal of the relay, the source electrode of the electronic switch tube is connected to an anode of the first freewheeling diode, the grid electrode of the electronic switch tube is connected to the emitter electrode of the second transistor, and the drain electrode and the grid electrode of the electronic switch tube are separately connected to both ends of the third resistor; the emitter electrode of the second transistor and the output terminal of the relay form a third resistor, so that the electronic switch tube is disconnected when a reverse charging occurs; and a cathode of the first freewheeling diode is connected to the input terminal of the relay.

The above control system, optional, wherein the reverse charging feedback circuit is provided with a second energy storage element, so that the time is reserved to connect the second energy storage element for charging before the reverse voltage drives the electronic switch tube to be disconnected.

The above control system, optional, wherein the control module is connected to the control end of the relay by a first control signal, and connected to the control end of the electronic switch tube by a second control signal delayed after the first control signal, so that the electronic switch tube can withstand the changes in voltage generated from the disconnection of the relay.

The above control system, optional, wherein the control module comprises a first drive circuit, a second drive circuit, a first energy storage element and a master control port, the master control port is connected to the control end of the second drive circuit the first control signal, the second drive circuit drives the connected to the control end of the electronic switch tube, the master control port is connected to the control end of the first drive circuit by the second control signal converted from the first control signal by means of the first energy storage element, the first drive circuit drives the control end of the relay, so that the break-over control of the master control port over the electronic switch tube is delayed after the break-over control of the control module over the relay, and the disconnection control of the electronic switch tube by the master control port is delayed after the disconnection control of the relay by the control module.

The above control system, optional, wherein the second drive circuit comprises a fourth transistor and a sixth resistor forming a break-over voltage drop in the fourth transistor, the base electrode of the fourth transistor is connected to the master control port, a collector electrode of the fourth transistor is connected to one end of an electromagnet of the relay, the other end of the electromagnet of the relay is connected to the first port, and an emitter electrode of the fourth transistor is connected to a common ground terminal; and the first drive circuit comprises a third transistor, a fifth resistor forming a break-over voltage drop in the third transistor, and a seventh resistor forming a break-over voltage drop in the electronic switch tube, a base electrode of the third transistor is connected to the master control port, an emitter electrode of the third transistor is connected to a common ground terminal one end of a seventh resistor is connected to a connector electrode of the third transistor, the other end of the seventh resistor is connected to the rid electrode of the electronic switch tube and the fifth resistor is connected in parallel with a second capacitor that serves as the first energy storage element, so that the first control signal indicating the break-over output by the master control port, after delaying the charging to the second capacitor controls the connection of the electronic switch tube; and the first control signal indicating the disconnection output by the master control port, after delaying the discharging from the second capacitor, controls the disconnection of electronic switch tube.

In the second aspect, the invention further provides An arc extinguishing control method for a relay of emergency power supply, which is applied to the arc extinguishing control system for a relay of an emergency power supply, including the following steps:

using the first control signal to control the connection of the relay, and using the second control signal delayed after the first control signal to control the connection of the electronic switch tube;

using the first control signal to control the disconnection of the relay, and using the second control signal delayed after the first control signal to control the disconnection of the electronic switch tube; and when the voltage of the second port of the emergency power supply is higher than the voltage of the first port of the emergency power supply, the reverse voltage applied by the second port to the first port is fed back to the control end of the electronic switch tube, so that the electronic switch tube is controlled to be disconnected in advance of the second control signal.

Compared with the prior art, the present disclosure has the beneficial effects as follows:

(1) The present disclosure uses a relay in physical contact to serve as a main switching circuit for controlling an emergency power supply, and electronic switching tubes are connected in parallel to two ends of the relay, so as to quickly withstand a voltage jump in a responsive way when the relay is disconnected, and thus, the relay is prevented from generating an arc spark in the disconnection process of the relay, the common problems of existing relays, such as arc damage and an internal resistance increase, are solved, and the relay that has a lower cost and a higher current withstand capability and does not need an additional heat sink is used as a device for controlling the switching on and off, so that safety, durability and market efficiency of an emergency start power supply of a vehicle are improved.

(2) In the present disclosure, when the phenomenon of heavy-current reverse charging occurring after the vehicle is started is faced, a reverse charging induction circuit and a reverse charging feedback circuit are used, so that a reverse charging current is directly fed back to a control end of an electronic switching tube when a storage battery is reversely charged by a load, thereby realizing quick disconnection of the electronic switching tube.

(3) The present disclosure further sets the first energy storage element, so that the electronic switch tube is connected or disconnected with a delay relative to the relay with a response speed in the order of milliseconds, and the accuracy of the control is ensured by the implementation of the hardware structure, so that the electronic switch tube can withstand the heavy current within a reasonable period of time, and the durability of the electronic switch tube is improved.

(4) The present disclosure further realizes the locking of the feedback current by setting the reverse charging feedback and utilizing the connection mode of the first transistor and the second transistor, so that the current output to the control end of the electronic switch tube falls within a safe range.

(5) The present disclosure further connects the electronic switch tube in parallel to the relay in a one-way connection mode, and the heavy current supplied by the emergency start power supply to the load will not pass through the electronic switch tube; similarly, the reverse charging induction circuit is also set in a one-way connection mode; components therein do not consumer electric power during normal operation; and the connection relay is equivalent to short-circuiting the electronic switch tube and the reverse charging induction circuit.

The present disclosure will be further described below with reference to the accompanying drawings.

REFERENCE NUMBERS 10. power supply line; 11. first port; 12. second port; 20. relay; 30. electronic switch tube; 40. control module; 41. first drive circuit; 42. second drive circuit; 43. master control port; 51. reverse charging induction circuit; 52. reverse charging feedback circuit; R1. first resistor; R2. second resistor; R3. third resistor; R4. fourth resistor; R5. fifth resistor; R6. sixth resistor; R7. seventh resistor; C1. first capacitor; C2. second capacitor; D1. first freewheeling diode; D2. second freewheeling diode; D3. third diode; Q1. first transistor; Q2. second transistor; Q3. third transistor; and Q4. fourth transistor.

DETAILED DESCRIPTION OF THE INVENTION

In order to better illustrate the objects, technical solutions and advantages of the present disclosure, specific implementation of the present disclosure will be further described below in detail in conjunction with the accompanying drawings and embodiments. The following embodiments are used for describing the present disclosure, but are not used for limiting the scope of the present disclosure.

Figure 1:
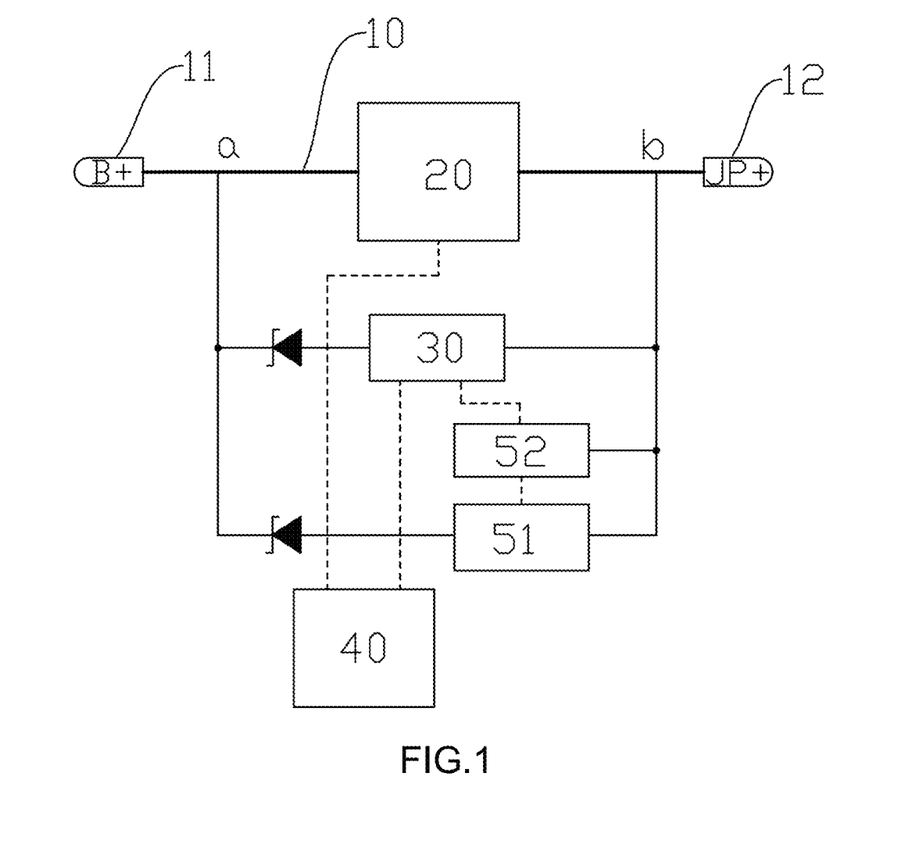
FIG. 1 is a schematic diagram of the principle of an arc extinguishing control system and method for a relay of an emergency power supply in an embodiment of the present disclosure.
Figure 2:
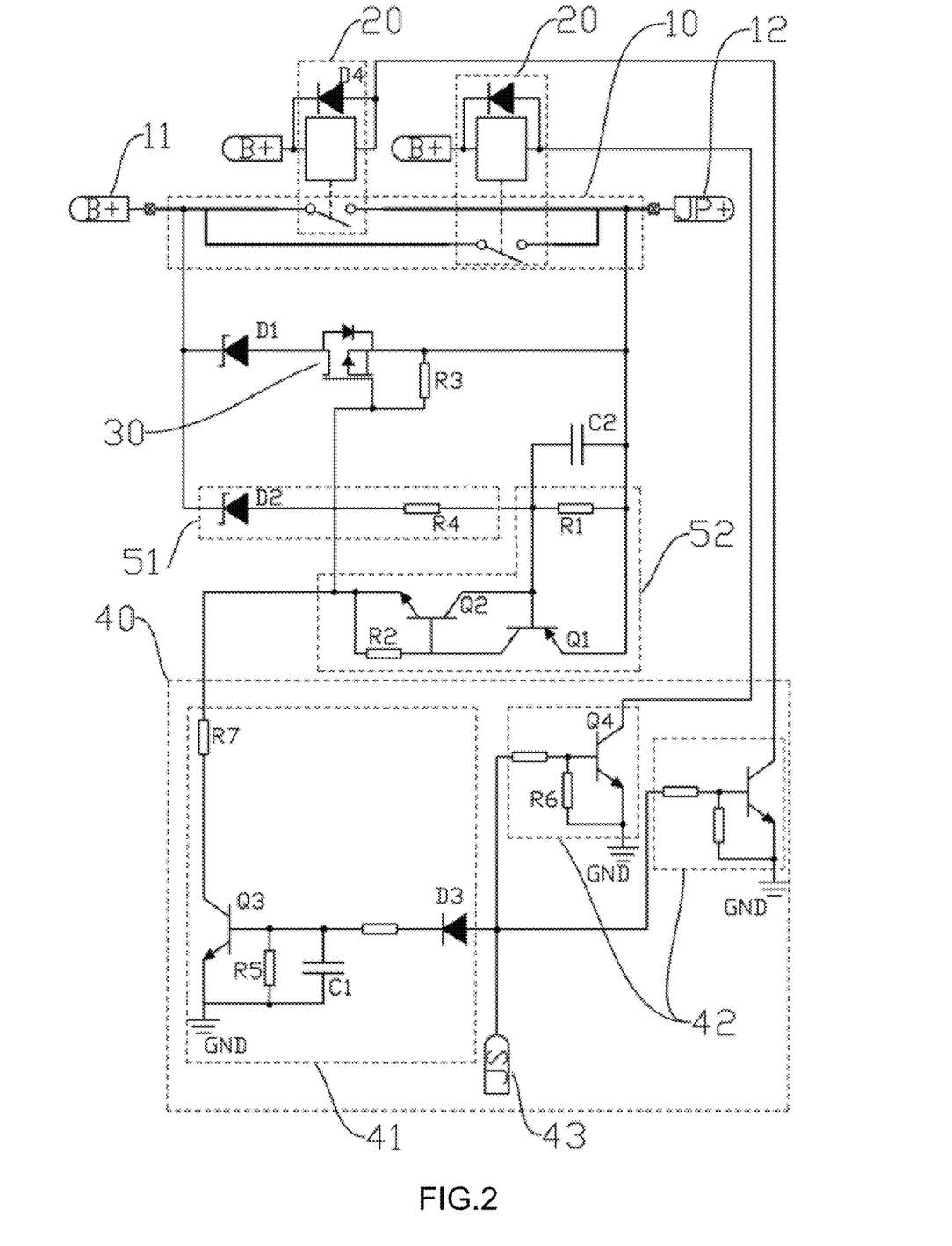
FIG. 2 is a schematic structural diagram of a circuit of an arc extinguishing control system and method for a relay of an emergency power supply in an embodiment of the present disclosure.

As shown in FIG. 1, an arc extinguishing control system for a relay of an emergency power supply in an embodiment according to the present disclosure, including a power supply line 10, a relay 20, an electronic switch tube 30, a control module 40, a reverse charging induction circuit 51 and a reverse charging feedback circuit 52. The power supply line 10 is arranged in the emergency power supply, where the power supply line includes a first port 11 for connecting a storage battery and a second port 12 for connecting a load line. FIGS. 1 and 2 illustrate a positive circuit of the power supply line 10, and actually including a negative circuit forming a current loop, both of which fall within the range of expression of the first port 11 and the second port 12. The relay 20 is connected in series to the power supply line 10. Specifically, the input terminal of an armature part used for switching of the relay 20 is connected to the first port 11, that is, connected to a storage battery of the emergency power supply; the output terminal of the armature part is connected to the second port 12, that is, connected to a starter motor or an on-board battery of the vehicle through a battery clip. The electronic switch tube 30 is a controllable semiconductor switching device, specifically an MOS field effect transistor capable of resisting a heavy current impact. It could be understood that, in other embodiments, the electronic switch tube 30 may further be other types of fully-controlled semiconductor switching devices, and a source electrode and a drain electrode of the MOS field effect transistor are respectively connected to an input terminal and an output terminal of the relay 20, that is, both ends of the armature part. On the one hand, the control module 40 is used to control a control end connected to the relay 20, that is, an electromagnetic coil of the relay 20, and is used to supply power to the electromagnetic coil or stop the power supply to a battery coil, so that the corresponding switch-on and switch-off states of the relay 20 can be adjusted. On the other hand, the control module 40 is further used to control the connection and disconnection of the electronic switch tube 30, that is to say, the control module 40 sets a high-level voltage or a low-level voltage at the drain electrode of the MOS field effect transistor, and the operating states of the MOS field effect transistor under the connection and disconnection is accordingly adjusted.

It can be seen therefrom that when the power supply line 10 has a relatively heavy current, and the relay 20 is suddenly disconnected, a large arc will inevitably be formed at the moment when the armature part is separated, and because the relay 20 is connected in parallel to the electronic switch tube 30, the electronic switch tube 30 connected in parallel to the relay remains in a conducting state in the process that the armature part of the relay 20 is separated, the heavy instantaneous current conducted by the relay can be loaded into the electronic switch tube 30, the process that the relay 20 generates the arc is often the moment when the armature part is separated, it is only necessary to continuously control the electronic switch tube 30 to maintain the conducting state in the order of milliseconds after the relay 20 is disconnected, so that factors generated by the arc can be eliminated, and the relay 20 is prevented from being damaged by the arc and the fire hazard of the arcs.

Further referring to FIG. 1, the arc extinguishing control system for a relay of an emergency power supply of the present embodiment is provided with the reverse charging induction circuit 51 and the reverse charging feedback circuit 52. The reverse charging refers to that the starter motor after being successfully charged by the emergency start power supply will supply power in a reverse direction as a power generator, that is to say, the power is supplied from the second port 12 to the first port 11, opposite to a direction in which the emergency power storage battery supplies power to the load in a normal state. Specifically, the reverse charging induction circuit 51 is connected in parallel between the emergency power storage battery and the load, so as to obtain a reverse voltage or a reverse current. The reverse charging feedback circuit 52 directly uses the induced reverse current to form a direct connection to the electronic switch tube 30 through power conversion of the reverse current. The reverse charging feedback circuit 52 bypass the control module 40, which takes a long time, to quickly drive the electronic switch tube 30 to be disconnected when a heavy current is generated.

It can be seen therefrom that the relay 20 itself is capable of withstanding a heavy current, and does not need additional heat sink. When the heavy reverse charging current occurs, the control module 40 can be used to quickly disconnect the relay 20, and after a short delay, the reverse current control can be directly used to control the disconnection of the electronic switch tube 30. Further, on the basis of arc extinguishing of the relay 20, the electronic switch tube 30 is disconnected and protected at a faster speed than that in the state without a reverse charging current.

It can be understood that, in addition to the arc extinguishing control system for a relay of an emergency power supply, the present disclosure further provides an arc extinguishing control method for a relay of an emergency power supply. The method includes:

In a basic system in which the relay 20 and the electronic switch tube 30 are connected in parallel to the power supply line 10, when the power supply line 10 needs to be connected, the relay 20 should be connected first, and the electronic switch tube 30 should be connected later. (which is safer, for the electronic switch tube 30 has a certain impedance, while the impedance of the relay 20 is lower);

when the start charging is completed and no heavy anti-reverse charging current is identified, a response is given to the command from the control module, the relay 20 should be disconnected first, and the electronic switch tube 30 is then disconnected with a longer delay (enabling the armature part of the relay 20 to be fully separated);

when the start charging is completed and a heavy anti-reverse charging current is identified, the voltage of the second port 12 is higher than that of the first port 11, or a current flows from the second port 12 to the first port 11 in the circuit, which is induced and determined by the reverse charging induction circuit 51, and the reverse charging feedback circuit 52 convert the reverse charging current through power conversion to output, and control the disconnection of the electronic switch tube 30 (In the prior art, there is a solution to control the relay 20 to make the first disconnected action according to the detection of the heavy anti-reverse charging current).

It should be noted that compared with the prior art, the control logic and logic program can be used to realize the effect of arc extinguishing and anti-backcharging of the emergency starting power supply of the vehicle, while the above method has the following benefit, by only using the circuit hardware, the above method not only realizes the effects of arc extinguishing, discharging and reverse charging, but also has the characteristics of low cost, good safety and durability.

Referring to FIG. 2, a specific circuit structure of an arc extinguishing control system for a relay of an emergency power supply according to an embodiment is provided.

Specifically, the electronic switch tube 30 includes a first freewheeling diode D1, which is connected in series to the electronic switch tube 30 and then connected to both ends of the relay 20 in parallel. Specifically, a cathode of the first freewheeling diode D1 is connected to the input terminal of the relay 20, that is, the first port 11 side, an anode of the first freewheeling diode D1 is connected to a source electrode of the electronic switch tube 30, and a drain electrode thereof is connected to the output terminal of the relay 20. When the electronic switch tube 30 is disconnected, the forward voltage from the drain electrode to the source electrode is cut off; when the electronic switch tube 30 is connected, the circuit is connected. A grid electrode of the electronic switch tube 30 is the control end of the electronic switch tube 30, and a third resistor R3 is arranged in parallel between the grid electrode and the drain electrode of the electronic switch tube 30 and used to configure the connection voltage of the electronic switch tube 30. When a forward voltage from the grid electrode to the drain electrode, the electronic switch tube 30 is connected, and when the voltage between the grid electrode and the drain electrode is insufficient or reverse voltage, the electronic switch tube is disconnected, as indicated by arrows of the electronic switch tube 30 in FIG. 1. The first freewheeling diode D1 is used to cut off the forward current from the storage battery of the emergency power supply towards the second port 12, and is also used to shunt the current to the relay 20.

Still referring to FIG. 2, the control module 40 includes a first drive circuit 41 for controlling the electronic switch tube 30, a second drive circuit 42 for controlling the relay 20, a first energy storage element (that is, a first capacitor C1) for forming a delay of the control signal, a first energy storage element for forming a delay of the control signal, and a master control port 43 for issuing a disconnection command. The first drive circuit 41 and the second drive circuit 42 can, according to a command from the master control port 43, accordingly form a corresponding control signal at the control end of the switch, such as a disconnection control signal or a connection control signal. The first drive circuit 41 is provided with the first energy storage element, so that the control signal sent at the same time will be delayed when it arrives at the first drive circuit than that at the second drive circuit without being provided an energy storage element. Generally, the delay is in the order of milliseconds, which satisfies the current range that the electronic switch tube 30 can withstand for delayed connection and disconnection.

Specifically, the master control port 43 is connected in series to a third diode D3, and the third diode D3 is used for isolating the power supply line 10. The master control port 43 is further connected in series to a resistor for voltage reduction and current limiting, and connected to a collector electrode of the third transistor Q3. An emitter electrode of the third transistor Q3 is connected to a common ground terminal, one end of a seventh resistor R7 is connected to a connector electrode of the third transistor Q3, the other end of the seventh resistor R7 is connected to the grid electrode of the electronic switch tube 30, and a fifth resistor R5 is connected in parallel with a second capacitor C2 that serves as the first energy storage element. When the third transistor Q3 is connected, a connection loop is formed among the common ground end, the seventh resistor R7, the third resistor R3 and the second port 12, so that the electronic switch tube 30 has a break-over voltage.

Specifically, the second drive circuit 42 includes a fourth transistor Q4 and a sixth resistor R6. The master control port 43 is connected to the base electrode of the fourth transistor Q4 through a resistor for voltage reduction and current limiting, and a voltage drop is formed at a sixth resistor R6 for turning on the fourth transistor Q4. A collector electrode of the fourth transistor Q4 is connected to one end of an electromagnet of the relay 20, the other end of the electromagnet of the relay 20 is connected to the first port 11, and an emitter electrode of the fourth transistor Q4 is connected to a common ground terminal. When the fourth transistor Q4 is connected, the first port 11, the electromagnet core (control end) of the relay 20, the fourth transistor Q4 and the power supply end are connected, to drive the relay 20 to be connected.

It could be understood that, when a control signal from the same master control port 43 controls the first drive circuit 41, the control signal needs to charge a first capacitor C1 at first, and then configure the voltage drop for the fifth resistor R5, and the third transistor Q3 is then connected. When the control signal controls the second drive circuit 42, it can directly configure the voltage drop for the sixth resistor R6, and the fourth transistor Q4 is then connected. Similarly, the disconnection of the fourth transistor Q4 is later than that of the third transistor Q3. In this embodiment, delayed connection and disconnection are implemented at the hardware level. It should be noted that the delayed connection of the electronic switch tube 30 is equivalent to a short circuit of the relay 20, so as to prevent the electronic switch tube 30 from being attacked by a heavy current.

Still referring to FIG. 1 and FIG. 2, specifically, the reverse charging induction circuit 51 includes a fourth resistor R4 and a second freewheeling diode D2, one end of a first resistor R1 is connected to the output terminal of the relay 20, the other end of the first resistor R1 is connected to one end of the fourth resistor R4, the other end of the fourth resistor R4 is connected to an anode of the second freewheeling diode D2, and a cathode of the second freewheeling diode D2 is connected to the input terminal of the relay 20, so that a reverse current flowing through a series circuit of the first resistor R1 and the fourth resistor R4 will form a voltage at the first resistor R1 that cooperates to connect the first transistor Q1. The second freewheeling diode D2 is used to prevent the storage battery of the start power supply from consuming the fourth resistor R4 and the first resistor R1. The fourth resistor R4 is used to configure the first resistor R1 to be a potential that can connect the first transistor Q1, specifically, a forward voltage from the emitter electrode to the base electrode of the first transistor Q1, so that it's connected.

Specifically, the reverse charging feedback circuit 52 includes the first resistor R1, the first transistor Q1, a second resistor R2 and a second transistor Q2. Both ends of the first resistor R1 are connected in parallel between the input end and the output end of the relay 20. An emitter electrode and a base electrode of the first transistor Q1 are separately connected to both ends of the first resistor R1, a collector electrode of the first transistor Q1 is connected to a base electrode of the second transistor Q2, the base electrode of the first transistor Q1 is connected to a collector electrode of the second transistor Q2, both ends of the second resistor R2 are respectively connected to the base electrode and the emitting electrode of the second transistor Q2, the emitter electrode of the second transistor Q2 is connected to the control end of the electronic switch tube 30, the first resistor R1 flows a reverse current and a break-over voltage is applied between the emitter electrode and the base electrode of the first transistor Q1, the connection of the first transistor Q1 makes the second resistor R2 flow a current, and a break-over voltage is applied to the base electrode and the emitter electrode of the second transistor Q2, so that the electronic switch tube 30 is switched to be disconnected.

It should be noted that, under the reserve charging of the heavy current, when the first transistor Q1 is connected, the current will then pass through the second resistor R2, so that the base electrode and the emitter electrode of the second transistor Q2 have a break-over forward direction. The voltage and current of the first resistor R1 are limited by the emitter electrode and the base electrode of the first transistor Q1, and then pass through the control end of the electronic switch tube 30 through the second transistor Q2. Similarly, the voltage and current of the second resistor R2 are limited by the base electrode and the emitter electrode of the second transistor Q2 and then pass through the control end of the electronic switch tube 30 through the first transistor Q1, the end of third resistor R3 is connected to the second port 12, which is in a high voltage state. So that a reverse potential from the drain electrode to the grid electrode of the electronic switch tube 30 is then formed, and the electronic switch tube 30 is thus disconnected.

It could be understood that, based on the principle similar to that of the first energy storage element of the first control module 40, the first resistor R1 is connected in parallel with a second energy storage element (that is, the second capacitor C2). The second capacitor C2, after detecting a heavy reverse charging current, controls the relay 20 to be disconnected before the electronic switch tube 30, to achieve arc suppression.

It can be understood that the number of relays 20 in the embodiment may be two, and each of the each relay 20 is connected to the master control port 43 in a controllable mode through its second drive circuit 42 to improve the voltage withstand performance of the power supply line 10.

According to the embodiments of the present disclosure, those skilled in the art can configure the arc extinguishing control system for a relay of an emergency power supply in the emergency start power supply device of the vehicle, and achieve significant advantages such as safety, low cost and durability.

Furthermore, terms "first", "second", and the like are merely for the purpose of description, and cannot be construed as indicating or implying relative importance or implicitly specifying the number of technical features indicated. Thus, a feature defined with "first" and "second" may explicitly or implicitly includes at least one of the features. In the description of the present disclosure, "a plurality of" means at least two, such as two, three, unless otherwise expressly and specifically defined. The above embodiments mainly describe the basic principle, main features and advantages of the present disclosure. It should be understood by those skilled in the art that, the present disclosure is not limited by the embodiments described above. The embodiments described above and the descriptions in the description merely illustrate the principles of the present disclosure. Various changes and modifications may be made to the present disclosure without departing from the spirit and scope of the present disclosure. These changes and modifications all fall within the claimed scope of the present disclosure.

What is claimed is:
1. An arc extinguishing control system for a relay of an emergency power supply, comprising:
a power supply line (10), one side thereof being provided with a first port (11) for connecting a battery, and the other side being provided with a second port (12) for connecting a load;

a relay (20), an input terminal thereof being connected to the first port (11) and an output terminal thereof being connected to the second port (12) for turning on and off the power supply line (10);
an electronic switch tube (30) connected in parallel between the input terminal and the output terminal of the relay (20);
a control module (40) being used for respectively connected to a control end of the relay (20) and a control end of the electronic switch tube (30) in a controllable mode, so that the electronic switch tube (30) can withstand changes in voltage generated from the disconnection of the relay (20);
a reverse charging induction circuit (51) used for inducing a reverse voltage applied from the output terminal to the input terminal of the relay (20); and
a reverse charging feedback circuit (52) used for feeding back the induced reverse voltage to the control end of the electronic switch tube (30) through voltage reduction, so as to control the electronic switch tube (30) to be disconnected when a reverse current occurs.

2. The arc extinguishing control system for a relay of an emergency power supply according to claim 1, wherein the reverse charging feedback circuit (52) comprises a first resistor (R1), a first transistor (Q1), a second resistor (R2) and a second transistor (Q2); both ends of the first resistor (R1) are connected in parallel the input terminal and the output terminal of the relay (20), an emitter electrode and a base electrode of the first transistor (Q1) are separately connected to both ends of the first resistor (R1), a collector electrode of the first transistor (Q1) is connected to a base electrode of the second transistor (Q2), the base electrode of the first transistor (Q1) is connected to a collector electrode of the second transistor (Q2), the base electrode and an emitter electrode of the second transistor (Q2) are separately connected to both ends of the second resistor (R2), the emitter electrode of the second transistor (Q2) is connected to the control end of the electronic switch tube (30), the first resistor (R1) flows the reverse current and a break-over voltage is applied between the emitter electrode and the base electrode of the first transistor (Q1), the connection of the first transistor (Q1) makes the second resistor (R2) flow a current, and a break-over voltage is applied to the base electrode and the emitter electrode of the second transistor (Q2), so that the electronic switch tube (30) is switched to be disconnected.

3. The arc extinguishing control system for a relay of an emergency power supply according to claim 2, wherein the reverse charging induction circuit (51) comprises a fourth resistor (R4) and a second freewheeling diode (D2), one end of the first resistor (R1) is connected to the output terminal of the relay (20), the other end of the first resistor (R1) is connected to one end of the fourth resistor (R4), the other end of the fourth resistor (R4) is connected to an anode of the second freewheeling diode (D2), and a cathode of the second freewheeling diode (D2) is connected to the input terminal of the relay (20), so that the reverse current flowing through a series circuit of the first resistor (R1) and the fourth resistor (R4) will form a voltage at the first resistor (R1) that cooperates to connect the first transistor (Q1).

4. The arc extinguishing control system for a relay of an emergency power supply according to claim 3, further comprising a first freewheeling diode (D1) and a third resistor (R3), wherein the electronic switch tube (30) is a field effect transistor, a drain electrode of the electronic switch tube is connected to the output terminal of the relay (20), a source electrode of the electronic switch tube is connected to an anode of the first freewheeling diode (D1), a grid electrode of the electronic switch tube is connected to the emitter electrode of the second transistor (Q2), and the drain electrode and the grid electrode of the electronic switch tube (30) are separately connected to both ends of the third resistor (R3); the emitter electrode of the second transistor (Q2) and the output terminal of the relay (20) form the third resistor (R3), so that the electronic switch tube (30) is disconnected when a reverse charging occurs; and a cathode of the first freewheeling diode (D1) is connected to the input terminal of the relay (20).

5. The arc extinguishing control system for a relay of an emergency power supply according to claim 2, wherein the reverse charging feedback circuit (52) is provided with a second energy storage element, so that the time is reserved to connect the second energy storage element for charging before the reverse voltage drives the electronic switch tube (30) to be disconnected.

6. The arc extinguishing control system for a relay of an emergency power supply according to claim 1, wherein the control module (40) is connected to the control end of the relay (20) by a first control signal, and connected to the control end of the electronic switch tube (30) by a second control signal delayed after the first control signal, so that the electronic switch tube (30) can withstand the changes in voltage generated from the disconnection of the relay (20).

7. The arc extinguishing control system for a relay of an emergency power supply according to claim 6, wherein the control module (40) comprises a first drive circuit (41), a second drive circuit (42), a first energy storage element and a master control port (43), the master control port (43) is connected to a control end of the second drive circuit (42) by the first control signal, the second drive circuit (42) drives the connected to the control end of the electronic switch tube (30), the master control port (43) is connected to the control end of the first drive circuit (41) by the second control signal converted from the first control signal by means of the first energy storage element, the first drive circuit (41) drives the control end of the relay (20), so that a break-over control of the master control port (43) over the electronic switch tube (30) is delayed after the break-over control of the control module (40) over the relay (20), and a disconnection control of the electronic switch tube (30) by the master control port (43) is delayed after the disconnection control of the relay (20) by the control module (40).

8. The arc extinguishing control system for a relay of an emergency power supply according to claim 6, wherein the second drive circuit (42) comprises a fourth transistor (Q4) and a sixth resistor (R6) forming a break-over voltage drop in the fourth transistor (Q4), a base electrode of the fourth transistor (Q4) is connected to a master control port (43), a collector electrode of the fourth transistor (Q4) is connected to one end of an electromagnet of the relay (20), the other end of the electromagnet of the relay (20) is connected to the first port (11), and an emitter electrode of the fourth transistor (Q4) is connected to a common ground terminal; and a first drive circuit (41) comprises a third transistor (Q3), a fifth resistor (R5) forming a break-over voltage drop in the third transistor (Q3), and a seventh resistor (R7) forming a break-over voltage drop in the electronic switch tube (30), a base electrode of the third transistor (Q3) is connected to the master control port (43), an emitter electrode of the third transistor (Q3) is connected to a common ground terminal, one end of a seventh resistor (R7) is connected to a connector electrode of the third transistor (Q3), the other end of the seventh resistor (R7) is connected to the grid electrode of the electronic switch tube (30), and the fifth resistor (R5)

is connected in parallel with a second capacitor (C2) that serves as a first energy storage element, so that the first control signal indicating the break-over output by the master control port (43), after delaying the charging to the second capacitor (C2), controls the connection of the electronic switch tube (30); and the first control signal indicating the disconnection output by the master control port (43), after delaying the discharging from the second capacitor (C2), controls the disconnection of electronic switch tube (30).

9. An arc extinguishing control method for a relay of emergency power supply, which is applied to the arc extinguishing control system for a relay of an emergency power supply according to claim 1, comprising the following steps:

using a first control signal to control the connection of the relay (20), and using a second control signal delayed after the first control signal to control the connection of the electronic switch tube (30);

using the first control signal to control the disconnection of the relay (20), and using the second control signal delayed after the first control signal to control the disconnection of the electronic switch tube (30); and when a voltage of the second port (12) of the emergency power supply is higher than a voltage of the first port (11) of the emergency power supply, a reverse voltage applied by the second port (12) to the first port (11) is fed back to the control end of the electronic switch tube (30), so that the electronic switch tube (30) is controlled to be disconnected in advance of the second control signal.

\* \* \* \* \*